United States Patent [19]

Dumain et al.

[11] Patent Number: 4,882,400
[45] Date of Patent: Nov. 21, 1989

[54] PROCESS FOR GAS PHASE POLYMERIZATION OF OLEFINS IN A FLUIDIZED BED REACTOR

[75] Inventors: Andre Dumain, Martigues; Charles Raufast, Saint Julien Les Martigues, both of France

[73] Assignee: BP Chemicals Limited, London, England

[21] Appl. No.: 224,997

[22] Filed: Jul. 27, 1988

[30] Foreign Application Priority Data

Jul. 31, 1987 [FR] France ............................ 87 11036

[51] Int. Cl.⁴ .............................................. C08F 2/34
[52] U.S. Cl. ...................................... 526/88; 526/106; 526/124; 526/901
[58] Field of Search ............... 526/88, 106, 124, 901, 526/67; 422/131

[56] References Cited

U.S. PATENT DOCUMENTS

| | | | |
|---|---|---|---|
| 3,023,203 | 2/1962 | Dye | 526/67 X |
| 4,640,963 | 2/1987 | Kreider et al. | 526/67 |

FOREIGN PATENT DOCUMENTS

| | | | |
|---|---|---|---|
| 1290555 | 3/1962 | France | 526/901 |
| 61-81406 | 4/1986 | Japan | 526/901 |

OTHER PUBLICATIONS

Translation of French Pat. 2,137,441 to Hartmann et al., published Dec. 29, 1972.
Translation of Japanese Kokai Pub. No. 57-128706 to Kato et al., published Aug. 10, 1982.

Primary Examiner—Joseph L. Schofer
Assistant Examiner—Fred M. Teskin
Attorney, Agent, or Firm—Brooks Haidt Haffner & Delahunty

[57] ABSTRACT

Process for gas phase polymerization of olefins using a highly active catalyst in a fluidized bed reactor (1), comprising a recator body (2) partially occupied by the fluidized bed and surmounted by a disengagement chamber (3). The gas mixture withdrawn from the disengagement chamber (3) is fed to a dust separator (6) e.g. a clycone, to separate the fine particles entrained by the gas. The gas is cooled, compressed and recycled to the base of the reactor. The particles are withdrawn from the dust separator (6) by a mixing device (8) which mixes the particles with a carrier gas. The carrier gas and particles are recycled to the reactor where they are introduced into the reactor body (2) through an opening in the side wall thereof at a position above the fluidized bed, but below the disengagement chamber (3). The velocity of the particles introduced into the reactor is insufficient to cause them to be blown directly into the bed.

9 Claims, 2 Drawing Sheets

PROCESS FOR GAS PHASE POLYMERIZATION OF OLEFINS IN A FLUIDIZED BED REACTOR

The invention relates to a process for gas phase polymerization of olefins by means of a fluidized bed reactor, in which olefins are directly converted into solid polymers or copolymers. The process of the invention is particularly applicable to the gas phase polymerization of ethylene, propylene, 1-butene, 1 hexene or 4-methyl-1-pentene, by themselves or mixed.

It is known to polymerize one or more olefins from a gaseous reaction mixture containing the olefin(s) to be polymerized, in a fluidized bed reactor where polymer particles which are being formed are kept in the fluidized state by means of the gaseous reaction mixture travelling as an ascending stream. The gas mixture leaving via the top of the fluidized bed reactor is recycled to the base of the latter by means of a recycle line and a compressor. While being thus recycled, the gas mixture is in most cases cooled with the aid of a heat exchanger so as to remove the heat produced during the polymerization reaction. The polymerization reaction may be carried out in the presence of a catalyst system of the Ziegler-Natta type, consisting of a solid catalyst essentially comprising a transition metal compound and of a cocatalyst comprising an organic compound of a light metal. High-activity catalyst systems capable of producing large quantities of polymer in a relatively short time and thus making it possible to avoid a step of removing catalyst residues in the polymer have already been known for a number of years. These high activity catalyst systems generally comprise a solid catalyst consisting essentially of atoms of transition metal, of magnesium and of halogen. It is also possible to make use of a high-activity catalyst consisting essentially of a chromium oxide activated by heat treatment and associated with a granular support based on refractory oxide.

Japanese patent application No. 57-128 706 discloses a process for gas phase polymerisation of olefins wherein the gas mixture leaving via the top of the fluidized bed reactor which contains polymer in the form of fine particles is fed to a cyclone in which the gas and particles are separated. The particles are removed from the bottom of the cyclone by suction, e.g. by using an ejector compressor, and recycled to the reactor. The particles are returned to the polymerisation zone of the reactor by introducing the particles and carrier gas directly into the polymer suspension and fluidisation zone or by "blow-in" to this zone from above. The drawing accompanying this Japanese application shows a powder recycle line which extends substantially horizontally from the suction device to the reactor and which extends vertically down inside the reactor to the fluidized bed.

The process described in J57-128 706 is intended to overcome the problem of undesireable polymerisation occurring in the cyclone which is liable to result in polymer adhering to the walls of the cyclone or blocking pipework. This being a particular problem when highly active catalysts are used. However, since the recovered particles are introduced directly into the fluidized bed or blown into it, there can be difficulties in carrying out this process. For example, when the particles are introduced directly into the fluidized bed, the pressure drop from the suction device to the reintroduction point can be relatively low and variable which can adversely affect the operation of the suction device, possibly resulting in the blockage of the device. It may also be difficult to achieve good dispersion of the particles in the relatively dense fluidized bed when they are reintroduced directly or "blown-in" from above. Poor dispersion of the recycled particles can result in the formation of hot spots and the production of polymer agglomerates in the fluidized bed. Also when a pipe is used which extends down through the reactor to just above the surface of the bed, to blow the particles into the bed, it is possible that polymer agglomerates will form on the pipe which could result in blockage of the pipe or adversely affect the operation of the suction device.

French patent application No. 2 137 441 discloses a process for gas phase polymerisation of olefins in a fluidized bed reactor in which the gas mixture leaving the top of the reactor which contains particles of polymer and catalyst is fed to a cyclone to separate the particles from the gas. The particles are recovered from the bottom of the cyclone using a suction device, e.g. an ejector compressor, and are then recycled back to the reactor. It is a feature of the invention that the need for an expensive disengagement zone can be avoided. In the absense of such a disengagement zone above the reactor, relatively large quantities of particles will be entrained by the gas mixture leaving the top of the reactor. Since the process is designed to be capable of recycling relatively large quantities of particles, the point at which the particles are reintroduced is not particularly important. The process may be useful for polymerising olefins using relatively low activity catalysts. However, if a high activity catalyst were to be employed in this process, it is likely that the cyclone, suction device and the recycle line would tend to block as a result of the fact that the relatively large quantity of particles containing highly active catalyst would enable polymerisation to continue.

British patent No. 954 078 discloses a process for gas phase polymerisation of olefins in which particles separated in a cyclone are returned to the reactor via a valve of the star-feeder type and a vertical recycle conduit which connects the bottom of the cyclone to the reactor. The particles fall back to the reactor under gravity. The residence time of the particles in the cyclone may be unacceptably long. It may be difficult to avoid undesireable polymerisation in the cyclone, star-feeder valve or in the conduit connecting the cyclone to the reactor, especially if highly active catalysts were to be used.

There has now been found a process for gas phase polymerization of olefins by means of a fluidized bed reactor making it possible to use advantageously high activity catalyst systems of the Ziegler Natta type comprising a solid catalyst consisting particularly of atoms of a transition metal such as titanium and vanadium, of magnesium and of halogen, or high-activity catalysts based on chromium oxide, which are activated by a heat treatment and are associated with a granular support based on refractory oxide. More particularly, this process makes it possible to avoid the disadvantages of the known processes. In particular, the process according to the present invention is less likely to result in blockage of the particle recycle line and has a relatively large pressure drop, between the device for sucking particles from the cyclone and the point of reintroduction to the reactor, which favours good and stable operation of the suction device. Furthermore, the finest particles entrained out of the fluidized bed reactor are reintroduced into a reactor zone where their return produces the least possible disturbance of the operation of the fluidized bed reactor, and where their dispersion in the reactor is as high as possible, so as to avoid locally high concentrations of active fine particles in the fluidized bed, capable of leading to the formation of agglomerates of molten polymer. It is found, furthermore, that when this process is implemented, the quantity of particles entrained out of the fluidized bed reactor is rather small, thus making easier their reintroduction into the reactor.

The subject of the invention is therefore a process for gas phase polymerization of one or more olefins of formula $CH_2=CHR$ in which R is a hydrogen atom or an alkyl radical containing from 1 to 6 carbon atoms, in the presence of a solid catalyst based on chromium oxide activated by heat treatment, or of a catalyst system of the Ziegler-Natta type comprising a solid catalyst consisting essentially of atoms of magnesium, of halogen and of at least one transition metal belonging to groups IV, V or VI of the Periodic Classification of the elements and a cocatalyst based on an organometallic compound of a metal belonging to groups II or III of this Classification, in which process a rising stream of a gas mixture containing the olefin(s) to be polymerized keeps the polyolefin particles being formed in the fluidized state in a fluidized bed reactor comprising an upright reactor body partially occupied by the fluidized bed and surmounted by a disengagement chamber of large cross-sectional area than that of the reactor body, from which disengagement chamber there leaves the gas mixture entraining solid particles which are separated from the gas mixture in a dust separator and are reintroduced into the reactor body, the gas mixture being then cooled, compressed and recycled to the base of the reactor and forming the recycle gas, the solid particles separated from the major part of the gas mixture are put into contact with a carrier gas in a mixing device and are reintroduced mixed with this carrier gas into the reactor body, the process being characterised in that the particles mixed with the carrier gas are introduced into the reactor body through an opening in the side wall thereof at a position above the fluidized bed, but below the disengagement chamber and in that the velocity of the particles introduced into the reactor body is insufficient to cause them to be blown directly into the bed.

The fluidized bed reactor in which the manufacture of the polyolefins by gas phase polymerization reaction of the olefin(s) takes place, generally comprises a cylinder intended to contain the fluidized bed, mounted under a disengagement chamber. For convenience, in this specification cylindrical reactors having a disengagement chamber of larger diameter will be described, although other shapes of reactor may be suitable.

The upright cylinder of diameter $D_1$ is equipped in its lower part with a fluidization grid. The distance between the fluidization grid and the top of the cylinder $H_1$ is generally such that the ratio $H_1/D_1$ is between 1 and 15, preferably between 2 and 8. The part of the cylinder which is situated above the fluidization grid is intended to be partially occupied by the fluidized bed over a height h measured between the fluidization grid and the top of the fluidized bed, which height is such that the ratio $h/H_1$ is between 0.2 and 0.9, preferably between 0.4 and 0.8. In the upper part of the cylinder which is not occupied by the fluidized bed, spattering of solid particles takes place continually when the bubbles of the gas mixture passing through the fluidized bed burst at the surface at the top of the bed. The height of this zone is preferably such that intensive entrainment of solid particles out of the cylinder is minimised and in particular is such that the amount of the spattering particles reaching the disengagement chamber is minimised. The operation of the disengagement chamber could be disturbed by particles spattering into the chamber.

The cylinder intended to contain the fluidized bed must be mounted under a disengagement chamber having a cross-section which is larger than that of the cylinder. This disengagement chamber may take the form of a bulb, of height $H_2$, consisting essentially of a frustum of a cone of revolution, with a vertical axis coinciding with the axis of the cylinder, with an apex forming an angle of between 10° and 60° and pointed downwards and mounted under a dome which can be of substantially hemispherical shape. The small base of this conical frustum coincides with the upper end of the reactor cylinder, and its large base, of diameter $D_2$ coincides with the base of the dome. It may also consist of a vertical cylinder joining the cylinder capable of containing the fluidized bed by means of a connecting surface in the shape of a funnel-shaped duct. This cylinder, with a height $H_2$ and a diameter $D_2$, has an axis coinciding with the upright axis of the cylinder capable of containing the fluidized bed and a roof which is generally of substantially hemispherical shape.

The essential function of the disengagement chamber is to slow down the ascending gas stream which, after having passed through the fluidized bed, can contain relatively large quantities of solid particles. As a result of this velocity reduction, most of the entrained solid particles return directly into the fluidized bed. Only the finest particles are entrained out of the reactor. In order to obtain the best performance of this fluidized bed reactor, the dimensions of the disengagement chamber are generally such that the ratio $D_2/D_1$ is between 1.3 and 2.2, and preferably between 1.5 and 2.0.

The polyolefin particles entrained out of the reactor are separated from most of the gas mixture in a dust separator which may, for example, consist of an apparatus containing baffles, or of a filter, or preferably of an apparatus employing centrifugal forces, such as a separator of the cyclone type. A number of dust separators may, of course, be employed in parallel and/or in series. After having been freed from the solid particles, the gas mixture is cooled in a heat exchanger so as to remove the heat produced during the polymerization reaction, is compressed with the aid of a gas compressor, and is recycled to the base of the reactor, under the fluidization grid, this cooled and compressed gas mixture thus forming the recycle gas.

According to the invention, the polyolefin particles separated from the gas mixture leaving the reactor are recovered with the aid of the dust separator, particularly at the bottom of the latter where it is a separator of the cyclone type. They must then be brought into contact with a carrier gas in a mixing device and must be reintroduced by means of this carrier gas into the upper part of the cylinder which is not occupied by the fluidized bed, that is to say into the zone of the cylinder above the top of the fluidized bed but below the disengagement chamber. The velocity of the particles introduced into the reactor is such that the particles are not blown directly into the fluidized bed. Thus, the particles are not directly injected through the surface of the bed, but rather they are mixed with other particles which are above the bed, i.e. those falling back from the disengagement chamber or spattering from bubbles bursting at the surface of the bed. The reintroduced particles can therefore fall back to the bed along with these other particles. Surprisingly, it is found that when the solid particles are reintroduced into the zone of the reactor which is situated just above the fluidized bed, the quantity of solid particles entrained out of the reactor does not increase substantially and does not lead to blocking of the mixing device, even when a high-activity catalyst or catalyst system is employed. It might have been expected that when these particles, which are generally very fine, are reintroduced above the fluidized bed, they would be immediately entrained out of the reactor and would thus go round and round, with their number increasing with time. It is thought that probably the solid particles are reintroduced into a zone of the reactor where the flow of the particles in circulation, especially the flow of the particles returning from the disengagement chamber into the fluidized bed, is high, causing most of the solid particles reintroduced to fall to the fluidized bed and thus to have a sufficient time to grow and no longer be entrained out of the reactor. It is observed, furthermore, that the reintroduction of the solid particles into the upper part of the cylinder which is not occupied by the fluidized bed makes it possible to avoid or at least minimise the formation of hot spots and of agglomerates. In all probability, these solid particles, which are generally fine and highly active, are well dispersed due to the fact that they are introduced into a zone above the fluidized bed which has a lower density than the fluidized bed itself.

The reintroduction of the solid particles into the fluidized bed reactor is performed by means of a device for mixing the solid particles with a carrier gas and a reintroduction pipework. The function of this mixing device is to bring the solid particles into contact with the carrier gas which is intended to convey these particles substantially uniformly diluted in the gas stream. The mixing device is preferably situated immediately below the lower part of the dust separator. It preferably consists of an ejector-compressor comprising a converging section, that is to say a portion whose cross section decreases, into which the carrier gas is introduced, a mixing chamber, connected to the particle exit orifice of the dust separator and, connected to the reactor, a diverging section, that is to say a portion of increasing cross-section.

The mixing device is advantageously chosen so that the relationship:

$$\frac{P_s - P_m}{P_e - P_s}$$

is between 0.1 and 2 and, preferably, between 0.3 and 1.6. $P_e$ being the pressure at the entry of the device (carrier gas entry) $P_m$ being the pressure in the mixing chamber and $P_s$ being the pressure at the exit of the device.

Furthermore, it is advantageous to employ a flow rate of carrier gas such that in the reintroduction pipework the following conditions are satisfied:
the ratio of the mass flow rate of the gas mixture accompanying the particles at the exit of the dust separator to the mass flow rate of the carrier gas is between 0.05 and 0.8;
the concentration of the particles in the mixture with the carrier gas is lower than 5 kg/m$^3$ and higher than 0.1 kg/m$^3$.

It is also recommended to choose the cross section of the connecting duct between the dust separator and the mixing device so that the velocity of the particles therein is between 0.5 and 5 m/s. This connecting duct is preferably of a length which is as short as possible.

The mixing device is connected to the fluidized bed reactor via a reintroduction pipework which opens into the side wall of the reactor. By not using a pipe which extends into the reactor, the operation of the fluidized bed, particularly the circulation of the solid particles and the homogeneous distribution of the gas stream rising in the fluidized bed reactor is not substantially disturbed. The fact that the reintroduction pipework opens into the side wall of the reactor at a position above the bed enables the mixing device, which uses the carrier gas to suck the particles from the cyclone, to operate efficiently and in a relatively stable manner and the risk of blockage of the mixing device and the recirculation pipework is reduced. Preferably, this reintroduction pipework has no angular parts. Furthermore, in order to facilitate the return of the solid particles into the fluidized bed, it is recommended that the reintroduction pipework opens into the side wall of the reactor with a slope which may be up to 60° relative to the horizontal plane and in particular with a slope of between 10° and 50°. The cross-section of the reintroduction pipework is preferably chosen such that the velocity of the mixture of solid particles and of the carrier gas is at least 1 m/s and not more than 10 m/s. The velocity of the particles entering into the reactor is generally from 1 to 10 m/s and is selected such that the particles are not blown directly into the bed.

The carrier gas must not be a poison or contain a poison for the polymerization reaction. It may contain or consist of a gas which is inert towards the catalyst or the catalyst system employed during the polymerization reaction, especially nitrogen. It may also consist wholly or in part of the olefin(s) which must be introduced into the reactor to compensate for the quantity consumed by the polymerization reaction. In order to avoid introducing into the polymerization reactor excessively large quantities of inert gas or of another gas which modifies the composition of the gas mixture, the carrier gas is preferably identical in nature with the gas mixture fed to the fluidized bed for forming the recycle gas. In practice, therefore, a fraction of the recycle gas, consisting of the gas mixture leaving the reactor, freed from the solid particles and compressed in order to compensate for the pressure drops in the circuit, will generally be used. This carrier gas can be employed at a relatively low pressure, bearing in mind the fact that the solid particles are reintroduced not into the fluidized bed, but into a less dense zone situated above the latter. This results in an energy saving in the compression of the carrier gas.

Bearing in mind the fact that the solid particles reintroduced into the fluidized bed reactor contain a high-activity catalyst or catalyst system, it is preferred to employ a carrier gas whose temperature is at least 15° C. lower than the polymerization temperature in the fluidized bed reactor. This is particularly preferred when the carrier gas contains at least one olefin, or consists of the gas mixture fed to the fluidized bed or forming the recycle gas, in order to avoid a premature polymerization reaction in the device for mixing the particles or in the reintroduction pipework which could, rapidly cause the blocking of this device or pipework. In this case, it is recommended that the carrier gas employed should be a fraction of the recycle gas which is drawn off after cooling and compression.

Figure 1:
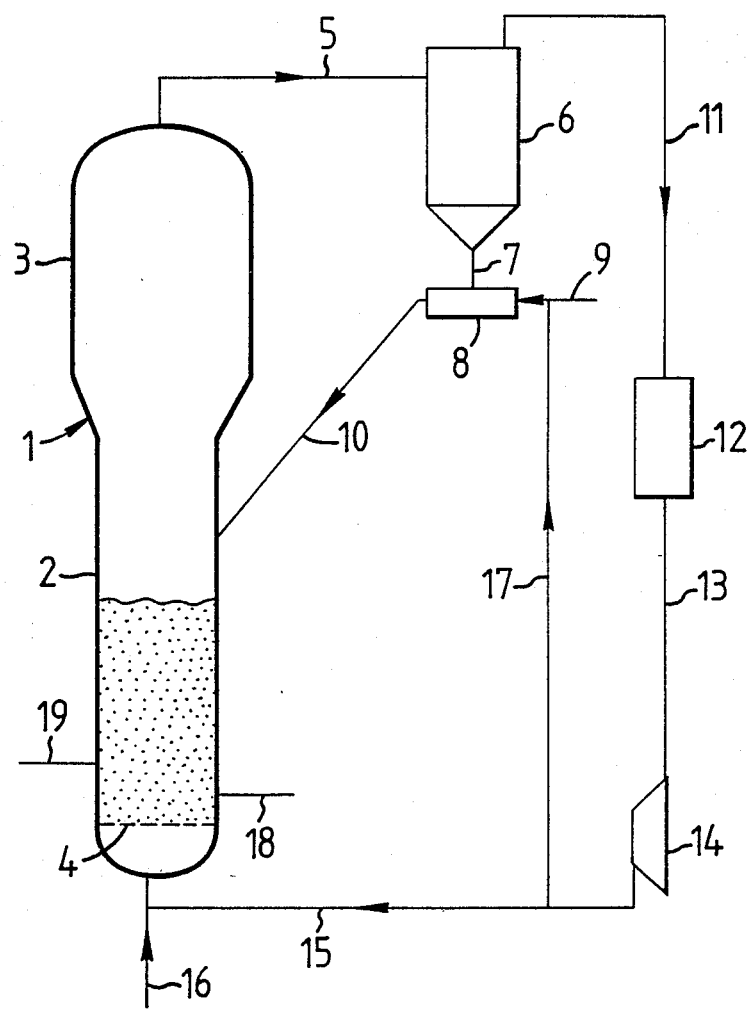
FIG. 1 shows diagrammatically an apparatus capable of being employed in the process of the invention.

The apparatus shown diagrammatically in FIG. 1 comprises a fluidized bed reactor (1) consisting of a vertical cylinder (2) mounted under a disengagement chamber (3) and provided in its lower part with a fluidization grid (4). The disengagement chamber (3) is connected by a conduit (5) to a dust separator of the cyclone type (6), in which the particles entrained by the gas mixture leaving the reactor (1) are separated from the gas. A conduit (7) connects the lower end of the cyclone (6) to the mixing chamber of an ejector-compressor (8), fed with carrier gas by the conduit (9). The pipework for reintroducing the solid particles (10) connects the ejector-compressor (8) to the reactor (1), this pipework (10) opening into the side wall of the cylinder (2) of the reactor (1) above the top of the fluidized bed, but below the disengagement chamber (3). A conduit (11) brings the upper part of the cyclone (6) into communication with a heat exchanger (12). A conduit (13) brings the heat exchanger (12) into communication with a compressor (14). A conduit (15) brings the compressor (14) into communication with the lower part of the reactor (1) which is situated under the fluidization grid (4). A conduit (17) connects the conduit (15) to the conduit (9) in order to feed the ejector-compressor (8) with carrier gas. The conduit (18) allows the reactor (1) to be fed with catalyst. The polyolefin particles produced are removed via the conduit (19). The conduit (16) is a feed conduit for constituents of the gas mixture, which enables the constancy of the composition and the pressure of this gas mixture to be maintained. The gas fed in via line 16 contains, especially the olefin(s) to be polymerized.

Figure 2:
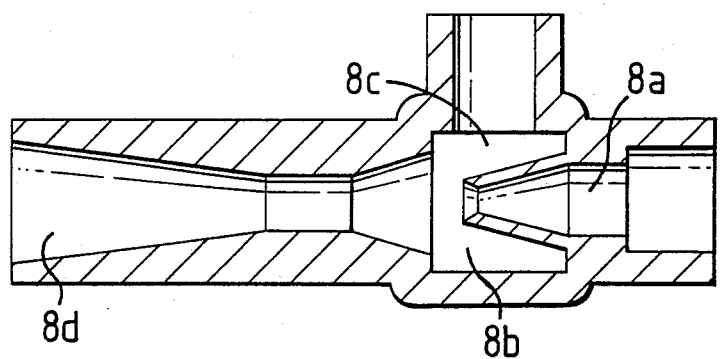
FIG. 2 shows diagrammatically a device for mixing solid particles with a carrier gas, of the ejector-compressor type.

FIG. 2 shows a detailed view of the ejector compressor (8). The latter consists essentially of three parts:

a converging section (8a) connected to the conduit (9) by which the carrier gas is introduced and ending in an orifice situated inside the mixing chamber (8b), a mixing chamber (8b) comprising an opening (8c) connected to the conduit (7) joining it to the dust separator and extended by a converging section and by a cylindrical section, which are situated on the axis of the converging section (8a) and a diverging section (8d) connected to the cylindrical portion of the mixing chamber (8b) and to the reintroduction pipework (10).

The apparatus shown in FIGS. 1 and 2 may be employed in the following manner:

After all parts of the apparatus have been purged by being swept with an inert gas such as nitrogen, particles of a polymer manufactured beforehand and of the catalyst are introduced via the conduit (18) into the reactor (1). The gas mixture containing the olefin or the olefins to be polymerized, and, where appropriate, hydrogen, is introduced via the conduit (16) mixed with the recycle gas originating through the conduit (15), the throttle flow rate of the gas being appropriate to maintain the particles of polymer and of catalyst in a fluidized state.

The excess gas containing solid particles leaves the reactor (1) via the conduit (5) and enters the cyclone (6), where the particles are separated from the gas. The gas leaves the cyclone (6) via the conduit (11), is cooled in the heat exchanger (12), then returns to the reactor (1) via the conduits (13) and (15), after having been compressed in the compressor (14), to a pressure which is sufficient to compensate for the pressure drops in the circuit. The operation of the heat exchanger (12) is regulated so as to maintain the temperature in the reactor (1) at the desired value. The particles separated off in the cyclone (6) and leaving the latter via the conduit (7) are sucked out by the carrier gas travelling in the ejector-compressor (8). The carrier gas feeding the ejector-compressor (8) via the conduit (9) consists of the gas mixture containing the olefin or the olefins to be polymerized and, where appropriate, hydrogen. It may advantageously consist of a part of the recycle gas, drawn off as a bypass in the conduit (15) via the conduit (17). The particles and the carrier gas leave the ejector-compressor (8) via the pipework (10) and are reintroduced above the fluidized bed present in the reactor (1). The particles are introduced into the reactor at a velocity such that they are not blown through the surface into the bed, but rather settle back onto the bed together with the other particles which are above the bed i.e. those particles falling back from the disengagement chamber (3) and those released by the bursting of bubbles at the surface of the bed. A part of the polymer present in the reactor (1) is evacuated at regular intervals via the conduit (19); it forms the output of the apparatus.

The process according to the invention is particularly suitable for the manufacture of polyolefins in gaseous phase by polymerization of ethylene or by co-polymerization of a mixture of alpha-olefins, such as ethylene, propylene, 1-butene, 1-hexene or 4-methyl-1-pentene, in the presence of a high-activity catalyst or catalyst system. The catalyst system may be of the Ziegler-Natta type and may comprise a solid catalyst consisting essentially of atoms of magnesium, of halogen, such as chlorine and bromine, and of at least one transition metal, such as titanium and vanadium, and a cocatalyst based on an organometallic compound of a metal belonging to groups II or III of the Periodic Classification of the elements, such as aluminium and zinc.

The solid catalyst may for example correspond to the general formula

$$Mg_m Me_n M(OR_1)_p (R_2)_q X_r D_s$$

in which Mg is the magnesium atom, Me is an aluminium and/or zinc atom, M is an atom of a transition metal belonging to groups IV, V and VI of the Periodic Classification of the Elements, preferably a titanium and/or vanadium atom, $R_1$ is an alkyl group containing from 2 to 14 carbon atoms, $R_2$ is an alkyl group containing from 2 to 12 carbon atoms, X is a chlorine and/or bromine atom, and D is an electron-donating compound containing at least one atom of oxygen, or of sulphur, or of nitrogen, or of phosphorus, with m between 0.5 and 50, preferably between 1 and 10, 35 n between 0 and 1, preferably between 0 and 0.5, p between 0 and 3, q between 0 and 1, preferably between 0 and 0.8, r between 2 and 104, preferably between 3 and 24, and s between 0 and 60, preferably between 0 and 20.

It is also possible to employ a high-activity catalyst based on chromium oxide, associated with a granular support based on a refractory oxide such as silica, alumina or aluminium silicate, and activated by heat treatment at a temperature of at least 250° C. and not exceeding 1,200° C., at which temperature the granular support may begin to sinter, preferably at a temperature of between 350° C. and 1,000° C.

The high-activity catalyst or catalyst system may be employed directly or after conversion into a catalyst or a catalyst system which is coated or in the form of a prepolymer. This conversion is generally carried out by placing the catalyst or catalyst system in contact with one or more alpha-olefins, in such quantities that the coated catalyst or catalyst system or the prepolymer contain between 0.002 and 10 millimoles of transition metal or of chromium per gram. This placing in contact may, furthermore, be performed in the presence of an organometallic compound of a metal belonging to groups II or III, in such quantity that the atomic ratio of the quantity of metal of the said organometallic compound to the quantity of transition metal or of chromium is between 0.1 and 50, preferably between 0.5 and 20.

The high-activity catalyst or catalyst system which is employed directly or after a coating or prepolymerization stage is introduced into the fluidized bed reactor. This introduction may be carried out in a hydrogen atmosphere or in an atmosphere of an inert gas such as nitrogen.

The polymerization is generally carried out at a presence of between 0.5 and 5 MPa, and at a temperature of between 0° and 130° C. The gas mixture passing through the fluidized bed polymerization reactor may contain, among the olefin(s) to be polymerized, dienes, hydrogen and a gas which is inert towards the high-activity catalyst system or catalyst, chosen, for example, from nitrogen, methane or ethane. It passes through the fluidized bed as a rising stream, with a fluidization velocity which is generally between 2 and 8 times the minimum fluidization velocity, in particular between 0.2 and 0.8 m/s. The fluidized bed consists of particles of polyolefin being formed, whose weight average diameter is between 0.3 and 2 mm.

The following examples illustrate the present invention.

EXAMPLE 1

The operation was carried out in an apparatus substantially as shown diagrammatically in FIG. 1. The fluidized bed reactor (1) consisted of a vertical cylinder with a diameter $D_1$ of 0.9 m and a height $H_1$ of 6 m, provided in its lower part with a fluidization grid (4) and mounted under a disengagement chamber (3) in the shape of a vertical cylinder of a height $H_2$ of 2.75 m and a diameter $D_2$ of 1.56 m. The reactor (1) contained a fluidized bed maintained over a substantially constant height h of 2.7 m above the fluidization grid, this bed consisted of 500 kg of a high density polyethylene (density 0.96 g/cm$^3$) powder in the form of particles with a weight average diameter of 0.7 mm. This reactor, heated and maintained at 92° C., was fed, at a rate of 1 kg/h, with a prepolymer consisting of particles with a weight average diameter of 0.25 mm, prepared with the aid of a high-activity catalyst system of the Ziegler Natta type, as described in Example 1 of French Patent No. 2,405,961, comprising a solid catalyst based on titanium, magnesium and chlorine, corresponding to the general formula $$Mg_{3.7}Ti(OC_3H_7)_3(C_4H_9)_{0.7}Cl_{7.7}$$

and a cocatalyst consisting of tri-n-octylaluminium.

A gas mixture containing, by volume, 40% of ethylene, 34% of hydrogen and 26% of nitrogen, at a pressure of 2 MPa, was fed at 70° C. to the base of the fluidized bed reactor, at a flow rate of 1,050 m$^3$/h and rose in the fluidized bed with a velocity of 0.5 m/s. The gas mixture left through the upper part of the reactor (1), entraining 0.8 kg/h of polyethylene particles with a diameter of between 0.01 and 0.12 mm. It then reached a cyclone (6) 0.44 mm in diameter and 1.76 m in height. The lower part of the cyclone (6) was connected by a 25 mm diameter conduit (7) to an ejector-compressor (8) substantially as shown in FIG. 2, in which the orifice at the end of the convergent section (8a) had a diameter of 6 mm. The mixing chamber 8(b) had a cylindrical portion having a diameter of 18 mm, and a convergent portion, the orifice of the convergent section (8a) and the entry of the convergent section of the mixing chamber (8b) being 8 mm apart. The gas mixture which left through the upper part of the cyclone (6) entrained less than 0.1 kg/h of solid particles. The solid particles which were removed through the lower part of the cyclone (6), were accompanied by 0.5 m$^3$/h of the gas mixture and were introduced into the mixing chamber of the ejector-compressor (8) fed at a rate of 1.5 m$^3$/h with a carrier gas consisting of the gas recycle mixture, compressed and cooled to 70° C. The pressure drop of the carrier gas in the ejector-compressor (8) was 0.022 MPa and the difference between the pressure prevailing at the outlet of the ejector-compressor (8) and that prevailing at the inlet of the mixing chamber (8b) was 0.025 MPa. The particles leaving the ejector-compressor (8) were reintroduced as a mixture with the carrier gas via a 25 mm diameter reentry line (10) which opened into the cylinder (2) at a distance of 4 m above the fluidization grid, that is to say at a distance of 1.3 m above the top of the fluidized bed.

Under these conditions, the fluidized bed reactor (1) operated continuously, producing approximately 100 kg/h of high-density polyethylene (density 0.96 g/cm$^3$). No formation of hot spots or of agglomerates of molten polymer in the fluidized bed reactor was observed. Furthermore, accumulation of particles in the cyclone (6) and no blocking of the ejector-compressor (8) or of the reentry pipework (10) was noted.

EXAMPLE 2

The operation was carried out in an apparatus identical with that described in Example 1. The reactor (1) contained a fluidized bed maintained at a constant height h of 2.7 m above the fluidization grid (4), this bed consisted of 450 kg of a linear low-density polyethylene (density 0.92 g/cm$^3$) powder in the form of particles with a weight average diameter of 0.7 mm. This reactor (1), heated and maintained at 80° C., was fed at a rate of 1 kg/h with a prepolymer identical with that employed in Example 1.

A gas mixture containing, by volume, 25% of ethylene, 10% of 1-butene, 5% of hydrogen and 60% of nitrogen, at a pressure of 2 MPa, was introduced at 65° C. at the base of the fluidized bed reactor (1), at a flow rate of 1,050 m$^3$/h and rose in the fluidized bed with a velocity of 0.5 m/s.

The gas mixture leaving through the upper part of the reactor (1), entrained 0.8 kg/h of polyethylene particles with a diameter of between 0.01 and 0.12 mm. It then reached a cyclone (6) identical with that employed in Example 1. The gas mixture leaving through the upper part of the cyclone (6) entrained less than 0.1 kg/h of solid particles. The particles leaving through the lower part of the cyclone (6), which were accompanied by 0.5 m³/h of the gas mixture, were introduced into an ejector-compressor (8) identical with that described in Example 1, fed at a rate of 1.5 m³/h with a carrier gas consisting of the recycle gas mixture, compressed and cooled to 65° C.

The pressure drop of the carrier gas in the ejector-compressor (8) was 0.033 MPa and the difference between the pressure prevailing at the outlet of the ejector-compressor (8) and that prevailing at the entry of the mixing chamber (8b) was 0.04 MPa. The particles which left the ejector-compressor (8) were reintroduced, as in Example 1, into the fluidized bed reactor (1) at a distance of 4 m above the fluidization grid (4), that is to say at a distance of 1.3 m above the top of the fluidized bed.

Under these conditions, the fluidized bed reactor (1) operated continuously, producing approximately 90 kg/h of linear low-density polyethylene (density 0.92 g/cm³). No formation of hot spots or of agglomerates of molten polymer in the fluidized bed reactor was observed. Furthermore, no accumulation of particles in the cyclone (6) and no blockage of the ejector-compressor (8) or of the reentry pipework (10) were noted.

EXAMPLE 3 (COMPARATIVE)

The operation was carried out in an apparatus identical with that described in Example 1, except for the fact that the reentry line (10) for the particles opened into the cylinder at a distance of 2.1 m above the fluidization grid (4), that is to say directly into the fluidized bed, at a distance of 0.6 m below the top of the bed.

The polymerization was carried out as in Example 1. Under these conditions, the fluidized bed reactor produced approximately 100 kg/h of high-density polyethylene (density 0.96 g/cm³). However, the formation of some agglomerates of molten polymer was observed, in the vicinity of the point where the reentry pipework for the particles (10) opened into the fluidized bed, requiring a reactor stoppage after several hours' production.

We claim:

1. A process for gas phase polymerization of one or more olefins of formula $CH_2=CH-R$ in which R is hydrogen atom or an alkyl radical containing from 1 to 6 carbon atoms, in the presence of a solid catalyst based on chromium oxide, activated by heat treatment, or of a catalyst system of the Ziegler-Natta type comprising a solid catalyst consisting essentially of atoms of magnesium, of halogen and of at least one transition metal belonging to groups IV, V or VI of the Periodic Classification of the elements and a cocatalyst based on an organometallic compound of a metal belonging to groups II or III of this Classification, in which process a rising stream of a gas mixture containing the olefin(s) to be polymerized keeps the polyolefin particles being formed in the fluidized state in a fluidized bed reactor (1) comprising an upright reactor body (2) partially occupied by the fluidized bed and mounted under a disengagement chamber (3) of larger cross-sectional area than that of the reactor body (2), from which disengagement chamber there leaves a gas mixture entraining solid particles which are separated from the gas mixture in a dust separator and are reintroduced into the reactor body (2), the gas mixture being then cooled, compressed and recycled to the base of the reactor, and forming the recycle gas, the solid particles separated from the major part of the gas mixture leaving the reactor are put into contact with a carrier gas in a mixing device and are reintroduced mixed with this carrier gas into the reactor body, the process being characterized in that the particles mixed with the carrier gas are introduced into the reactor body through an opening in the side wall thereof at a position above the fluidized bed, but below the disengagement chamber and in that the velocity of the particles introduced into the reactor body is insufficient to cause them to be blown directly into the bed.

2. A process according to claim 1, characterized in that the height h of the fluidized bed, measured between the fluidization grid and the top of the fluidized bed, is such that the ratio $h/H_1$ is between 0.2 and 0.9, $H_1$ being the distance separating the fluidization grid from the top of the reactor body (2).

3. A process as claimed in claim 1 in which the carrier gas contains at least one olefin to be polymerized.

4. A process as claimed in claim 3 in which the carrier gas is identical in nature with the gas mixture fed to the fluidized bed or with the recycle gas.

5. A process as claimed in claim 1 in which the carrier gas has a temperature which is at least 15° C. lower than the polymerization temperature in the fluidized bed reactor.

6. A process as claimed in claim 1 in which the velocity of the carrier gas mixed with the particles is at least 1 m/s and not more than 10 m/s in the reintroduction pipework.

7. A process as claimed in claim 1 in which the concentration of the particles in the mixture with the carrier gas is lower than 5 kg/m³ and higher than 0.1 kg/m³.

8. A process as claimed in claim 1 in which the the dust separator is a cyclone.

9. A process as claimed in claim 1 in which the mixing device is an ejector-compressor.

* * * * *

UNITED STATES PATENT AND TRADEMARK OFFICE
CERTIFICATE OF CORRECTION

PATENT NO. : 4,882,400
DATED : November 21, 1989
INVENTOR(S) : Andre Dumain et al It is certified that error appears in the above-identified patent and that said Letters Patent is hereby corrected as shown below:

ON TITLE PAGE:

Abstract, l. 7, correct spelling of "cyclone"

Col. 9, lines 32-33, change "presence" to --pressure--

Signed and Sealed this

Thirtieth Day of July, 1991

Attest:

HARRY F. MANBECK, JR.

*Attesting Officer*   *Commissioner of Patents and Trademarks*